United States Patent
Li

(10) Patent No.: US 8,593,118 B2
(45) Date of Patent: Nov. 26, 2013

(54) POWER SUPPLY APPARATUS WITH FAST INITIATING SPEED AND POWER SUPPLY SYSTEM WITH MULTIPLE POWER SUPPLY APPARATUSES WITH FAST INITIATING SPEED

(75) Inventor: Sheng-Hua Li, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 450 days.

(21) Appl. No.: 12/760,805

(22) Filed: Apr. 15, 2010

(65) Prior Publication Data

US 2010/0264893 A1 Oct. 21, 2010

(30) Foreign Application Priority Data

Apr. 16, 2009 (TW) .............................. 98112698 A

(51) Int. Cl.
G05F 1/00 (2006.01)

(52) U.S. Cl.
USPC .......................................... 323/272; 323/283

(58) Field of Classification Search
USPC ......... 323/234, 268, 269, 271–272, 282–285; 363/65
See application file for complete search history.

(56) References Cited

U.S. PATENT DOCUMENTS

| | | | | |
|---|---|---|---|---|
| 7,061,213 B2* | 6/2006 | Yoshida | | 323/224 |
| 7,557,583 B2* | 7/2009 | Zettel et al. | | 324/418 |
| 7,576,521 B2* | 8/2009 | Komiya | | 323/268 |
| 7,714,553 B2* | 5/2010 | Lou | | 323/276 |
| 7,990,119 B2* | 8/2011 | Petty | | 323/273 |
| 8,085,013 B2* | 12/2011 | Wei et al. | | 323/269 |
| 2009/0243577 A1* | 10/2009 | Lim | | 323/283 |

* cited by examiner

*Primary Examiner* — Adolf Berhane
*Assistant Examiner* — Jeffrey Gblende
(74) *Attorney, Agent, or Firm* — Kirton McConkie; Evan R. Witt

(57) ABSTRACT

A power supply apparatus includes a first output power circuit, a first output protection circuit, a first output capacitor, a first pre-charging circuit and a first power supply control circuit. The first output power circuit is used for generating a first internal output voltage. The first output protection circuit is connected to a power output terminal of the first output power circuit for limiting the current direction. The first pre-charging circuit is interconnected between a power input terminal and a power output terminal of the first output protection circuit for providing a first pre-charging path. When the first power-on signal is switched from a disabled status to an enabled status, a first pulse width modulation signal having a higher or the maximum duty cycle is transmitted from the first power supply control circuit to the control terminal of the first switching circuit, thereby enabling the first output power circuit.

32 Claims, 4 Drawing Sheets

POWER SUPPLY APPARATUS WITH FAST INITIATING SPEED AND POWER SUPPLY SYSTEM WITH MULTIPLE POWER SUPPLY APPARATUSES WITH FAST INITIATING SPEED

FIELD OF THE INVENTION

The present invention relates to a power supply apparatus, and more particularly to a power supply apparatus to be quickly initiated. The present invention relates to a power supply system with multiple power supply apparatuses.

BACKGROUND OF THE INVENTION

Power supply apparatuses are essential for many electronic appliances such as personal computers, industrial computers, servers, communication products or network products. Usually, the user may simply plug a power supply apparatus into an AC wall outlet commonly found in most homes or offices so as to receive an AC voltage. The power supply apparatus will convert the AC voltage into a regulated DC output voltage for powering the electronic device and/or charging a battery built-in the electronic device.

Generally, power supply apparatuses are classified into two types, i.e. linear power supply apparatuses and switching power supply (SPS) apparatuses. A linear power supply apparatus principally comprises a transformer, diode rectifier and a capacitor filter. The linear power supply apparatus is advantageous due to its simplified circuitry and low fabricating cost. Since the linear power supply apparatus has bulky volume, the linear power supply apparatus is not applicable to a slim-type electronic device. In addition, the converting efficiency of the linear power supply apparatus is too low to comply with the power-saving requirements. In comparison with the linear power supply apparatus, the switching power supply apparatus has reduced volume but increased converting efficiency. That is, the switching power supply apparatus is applicable to the slim-type electronic device and may meet with the power-saving requirements.

As known, the electricity consumption amount of the electronic device is varied in different situations. For example, a power supply system may have multiple power supply apparatuses simultaneously providing electrical energy to the electronic device. The multiple power supply apparatuses could increase the power supply quantity. Even if the power supply quantity is sufficient to power the electronic device, one or more additional power supply apparatuses are served as backup power supply apparatuses in order to reduce the problems resulted from one or more damaged power supply apparatuses.

Since the speeds of initiating the conventional power supply apparatuses are very slow, if one of the power supply apparatuses has a breakdown, the backup power supply apparatuses need to be enabled to continuously provide electrical energy to the electronic device. If all power supply apparatuses are operated under light loads, the operating efficiency of each power supply apparatuses is insufficient. Moreover, if the electricity consumption amount of the electronic device is very low, the power supply amount is enough when some of the power supply apparatuses are enabled. Since all power supply apparatuses are enabled, the overall operating efficiency of the power supply system is reduced.

There is a need of providing a power supply system with multiple power supply apparatuses so as to obviate the drawbacks encountered from the prior art.

SUMMARY OF THE INVENTION

An object of the present invention provides a power supply system with multiple power supply apparatuses, in which the speeds of initiating the power supply apparatuses are increased. Due to the high initiating speeds of the power supply apparatuses, some of the power supply apparatuses could be selectively disabled. Under this circumstance, the operating efficiency of each power supply apparatuses and the overall operating efficiency of the power supply system are enhanced. In a case that one or more power supply apparatuses have a breakdown, the power supply system still provides sufficient electrical energy to the electronic device.

In accordance with an aspect of the present invention, there is provided a power supply apparatus for receiving a first input voltage and generating an output voltage to a system circuit. The power supply apparatus includes a first output power circuit, a first output protection circuit, a first output capacitor, a first pre-charging circuit and a first power supply control circuit. The first output power circuit includes a first switching circuit for receiving the first input voltage. The first switching circuit is alternately conducted or shut off, so that the first input voltage is converted into a first internal output voltage. The first output protection circuit is connected to a power output terminal of the first output power circuit for limiting the current direction. The electrical energy of the first internal output voltage is transmitted to the system circuit through the first output protection circuit. The first output capacitor is connected to the power output terminal of the first output power circuit. The first pre-charging circuit is interconnected between a power input terminal and a power output terminal of the first output protection circuit for providing a first pre-charging path. The first power supply control circuit is connected to a control terminal of the first switching circuit and the power output terminal of the first output power circuit for determining whether a first pulse width modulation signal is transmitted to the control terminal of the first switching circuit according to a first power-on signal. When the first power-on signal is switched from a disabled status to an enabled status, a first pulse width modulation signal having a higher or the maximum duty cycle is transmitted from the first power supply control circuit to the control terminal of the first switching circuit, thereby enabling the first output power circuit.

In accordance with another aspect of the present invention, there is provided a power supply system having multiple power supply apparatuses for receiving a first input voltage and/or a second input voltage and generating an output voltage to a system circuit. The power supply system includes a first power supply apparatus, a second power supply apparatus, a power supply system control circuit and a logical control unit. The first power supply apparatus has an output terminal connected with the system circuit. The first power supply apparatus generates the output voltage to the system circuit according to a first power-on signal, and generates a first power status signal corresponding to the first power-on signal. The second power supply apparatus has an output terminal connected with the system circuit. The second power supply apparatus generates the output voltage to the system circuit according to a second power-on signal, and generates a second power status signal corresponding to the second power-on signal. The power supply system control circuit is connected with the first power supply apparatus, the second power supply apparatus and the system circuit for generating a first main switch-on signal and a second main switch-on signal according to the first power status signal and the second power status signal, thereby controlling transmission of electrical energy from the first power supply apparatus and the second power supply apparatus to the system circuit, and generating a system power status signal. The logical control unit is connected with the first power supply apparatus, the second power supply apparatus and the power supply system control circuit for generating the first power-on signal and the second power-on signal according to the first power status signal, the second power status signal, the first main switch-on signal, the second main switch-on signal and the system power status signal, thereby controlling transmission of electrical energy from the first power supply apparatus and the second power supply apparatus to the system circuit.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
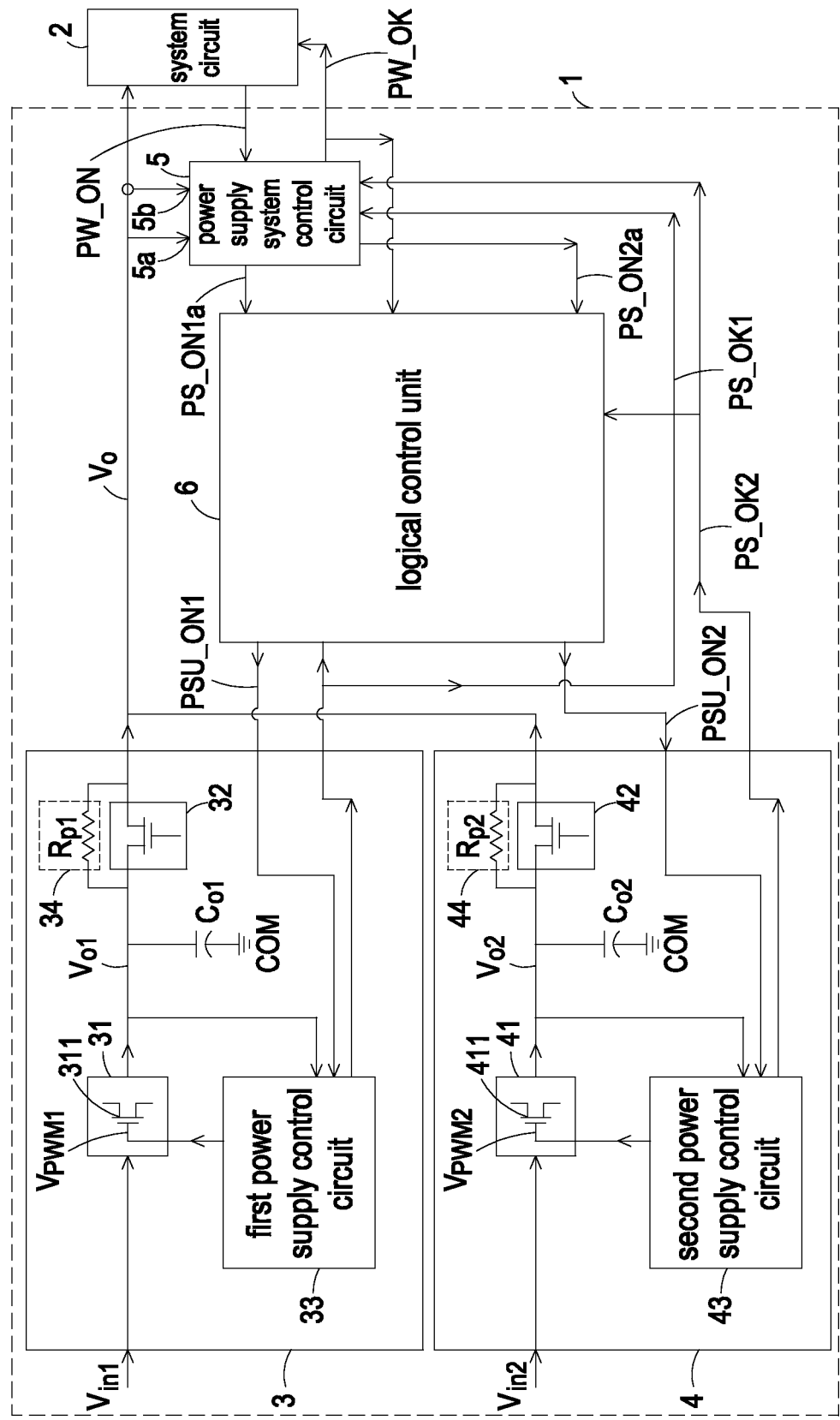
FIG. 1 is a schematic circuit diagram illustrating a power supply system according to a first embodiment of the present invention.

FIG. 1 is a schematic circuit diagram illustrating a power supply system according to a first embodiment of the present invention. The power supply system comprises multiple power supply apparatuses. For clarification, only two power supply apparatuses are shown. As shown in FIG. 1, the power supply system 1 receives a first input voltage $V_{in1}$ or a second input voltage $V_{in2}$, and generates an output voltage $V_o$ having an rated voltage to a system circuit 2 of an electronic device. The power supply system 1 comprises a first power supply apparatus 3, a second power supply apparatus 4, a power supply system control circuit 5 and a logical control unit 6. The output terminals of the first power supply apparatus 3 and the second power supply apparatus 4 are connected to the system circuit 2. According to a first power-on signal PSU_ON1, the first power supply apparatus 3 receives the first input voltage $V_{in1}$ and generates output voltage $V_o$ having the rated voltage to a system circuit 2. Similarly, according to a second power-on signal PSU_ON2, the second power supply apparatus 4 receives the second input voltage $V_{in2}$ and generates output voltage $V_o$ having the rated voltage to a system circuit 2.

The first power supply apparatus 3 and the second power supply apparatus 4 are further connected with the power supply system control circuit 5 and the logical control unit 6. In addition, the first power supply apparatus 3 and the second power supply apparatus 4 will respectively generate a first power status signal PS_OK1 and a second power status signal PS_OK2 to the power supply system control circuit 5 and the logical control unit 6, thereby determining whether the first power supply apparatus 3 and the second power supply apparatus 4 could normally provide electrical energy to the system circuit 2.

The power supply system control circuit 5 is connected to the first power supply apparatus 3, the second power supply apparatus 4, the system circuit 2 and the logical control unit 6. The power supply system control circuit 5 has a voltage-detecting terminal 5a and a current-detecting terminal 5b for detecting the electricity consumption amount of the system circuit 2. According to the electricity consumption amount of the system circuit 2, the first power status signal PS_OK1 and the second power status signal PS_OK2, a first main switch-on signal PS_ON1a and a second main switch-on signal PS_ON2a are adaptively generated by the power supply system control circuit 5, thereby determining whether the first power supply apparatus 3 and the second power supply apparatus 4 could normally provide electrical energy to the system circuit 2. According to the first power status signal PS_OK1 and the second power status signal PS_OK2, a system power status signal PW_OK is generated by the power supply system control circuit 5. According to the system power status signal PW_OK, the system circuit 2 could determine whether the operation of the power supply system 1 is normal.

The logical control unit 6 is connected with the first power supply apparatus 3, the second power supply apparatus 4 and the power supply system control circuit 5. According to the first power status signal PS_OK1, the second power status signal PS_OK2, the first main switch-on signal PS_ON1a, the second main switch-on signal PS_ON2a and the system power status signal PW_OK, the logical control unit 6 generates the first power-on signal PSU_ON1 and the second power-on signal PSU_ON2. According to the first power-on signal PSU_ON1 and the second power-on signal PSU_ON2, the logical control unit 6 will determine whether the first power supply apparatus 3 and the second power supply apparatus 4 normally provides electrical energy to the system circuit 2.

An example of the logical control unit 6 includes but is not limited to a non-time sequence combinational logic circuit. An example of the power supply system control circuit 5 includes but is not limited to a time sequence control circuit or a time sequence logic circuit such as a digital signal processor (DSP) or a microprocessor. Since the time sequence control circuit is operated according to clock signals, the power supply system control circuit 5 has a slower response speed than the logical control unit 6. For example, when the digital signal processor (DSP) or the microprocessor is used to execute a specified program or implement some tasks, the power supply system control circuit 5 needs several cycle periods of the clock signal to generate the first main switch-on signal PS_ON1a and the second main switch-on signal PS_ON2a according to the electricity consumption amount of the system circuit 2, the first power status signal PS_OK1 and the second power status signal PS_OK2. In other words, the response speed of the supply control circuit 5 is relatively slower.

On the other hand, the logical control unit 6 is not operated according to clock signals. When the statuses of first power status signal PS_OK1, the second power status signal PS_OK2, the first main switch-on signal PS_ON1a, the second main switch-on signal PS_ON2a and the system power status signal PW_OK are changed, the logical control unit 6 will quickly generate the corresponding first power-on signal PSU_ON1 and second power-on signal PSU_ON2. According to the first power-on signal PSU_ON1 and the second power-on signal PSU_ON2, the first power supply apparatus 3 and the second power supply apparatus 4 are quickly enabled to provide electrical energy to the system circuit 2. In other words, the response speed of the logical control unit 6 is relatively faster.

In this embodiment, if the electricity consumption amount of the system circuit 2 is greater than the rated electricity supply amount of the first power supply apparatus 3 or the second power supply apparatus 4, it is meant that one of the first power supply apparatus 3 and the second power supply apparatus 4 fails to provide sufficient electrical energy to the system circuit 2. Meanwhile, the first main switch-on signal PS_ON1a and the second main switch-on signal PS_ON2a generated by the power supply system control circuit 5 are in the enabled statuses, and the first power-on signal PSU_ON1 and the second power-on signal PSU_ON2 generated by the logical control unit 6 are also in the enabled statuses. As a consequence, the first power supply apparatus 3 and the second power supply apparatus 4 are simultaneously enabled to provide electrical energy to the system circuit 2.

On the other hand, if the electricity consumption amount of the system circuit 2 is smaller than the rated electricity supply amount of the first power supply apparatus 3 or the second power supply apparatus 4, it is meant that either the first power supply apparatus 3 or the second power supply apparatus 4 could provide sufficient electrical energy to the system circuit 2. Meanwhile, one of the first main switch-on signal PS_ON1a and the second main switch-on signal PS_ON2a generated by the power supply system control circuit 5 is in the enabled status but the other is in the disabled status, and one of the first power-on signal PSU_ON1 and the second power-on signal PSU_ON2 generated by the logical control unit 6 is in the enabled status but the other is in the disabled status. As a consequence, either the first power supply apparatus 3 or the second power supply apparatus 4 is enabled to provide electrical energy to the system circuit 2.

For example, if the electricity consumption amount of the system circuit 2 is smaller than the rated electricity supply amount of the first power supply apparatus 3, it is meant that the first power supply apparatus 3 could provide sufficient electrical energy to the system circuit 2. Meanwhile, the first main switch-on signal PS_ON1a and the second main switch-on signal PS_ON2a generated by the power supply system control circuit 5 are respectively in the enabled status and the disabled status. According to the first main switch-on signal PS_ON1a in the enabled status and the second main switch-on signal PS_ON2a in the disabled status, the first power-on signal PSU_ON1 and the second power-on signal PSU_ON2 generated by the logical control unit 6 are respectively in the enabled status and the disabled status. As a consequence, the first power supply apparatus 3 is enabled to provide electrical energy to the system circuit 2 but the second power supply apparatus 4 is disabled.

In an embodiment, one of the first power supply apparatus 3 and the second power supply apparatus 4 provides electrical energy to the system circuit 2. In a case that the first input voltage $V_{in1}$ or the second input voltage $V_{in2}$ is abnormal or interrupted, the first power supply apparatus 3 or the second power supply apparatus 4 that is originally enabled fails to continuously provide electrical energy to the system circuit 2. As such, the first power status signal PS_OK1 or the second power status signal PS_OK2 is switched from an enabled status to a disabled status. At this moment, according to the first power status signal PS_OK1 or the second power status signal PS_OK2 in the disabled status, the power supply system control circuit 5 fails to immediately switch the first main switch-on signal PS_ON1a or the second main switch-on signal PS_ON2a from the disabled status to the enabled status. Since the response speed of the logical control unit 6 is relatively faster, according to the first power status signal PS_OK1 or the second power status signal PS_OK2 in the disabled status, the logical control unit 6 will immediately switch the first power-on signal PSU_ON1 or the second power-on signal PSU_ON2 from the disabled status to the enabled status. According to the first power-on signal PSU_ON1 or the second power-on signal PSU_ON2 in the enabled status, the first power supply apparatus 3 or the second power supply apparatus 4 that is originally disabled will be enabled to provide electrical energy to the system circuit 2. After a certain time period, the power supply system control circuit 5 will switch the first main switch-on signal PS_ON1a or the second main switch-on signal PS_ON2a from the disabled status to the enabled status according to the first power status signal PS_OK1 or the second power status signal PS_OK2 in the disabled status.

For example, the first power supply apparatus 3 is originally enabled to provide electrical energy to the system circuit 2. In a case that the first input voltage $V_{in1}$ is abnormal or interrupted, the first power supply apparatus 3 fails to continuously provide electrical energy to the system circuit 2. As such, the first power status signal PS_OK1 is switched from an enabled status to a disabled status. According to the first power status signal PS_OK1, the logical control unit 6 will immediately switch the second power-on signal PSU_ON2 from the disabled status to the enabled status. According to the second power-on signal PSU_ON2 in the enabled status, the second power supply apparatus 4 that is originally disabled will be enabled to provide electrical energy to the system circuit 2. After a certain time period, the power supply system control circuit 5 will switch the second main switch-on signal PS_ON2a from the disabled status to the enabled status according to the second power status signal PS_OK2 in the disabled status.

In this embodiment, the first power supply apparatus 3 comprises a first output power circuit 31, a first output protection circuit 32 (e.g. an O-ring protection circuit), a first output capacitor $C_{o1}$, a first power supply control circuit 33 and a first pre-charging circuit 34. The first output power circuit 31 includes a first switching circuit 311 for receiving the first input voltage $V_{in1}$. The first switching circuit 311 is alternately conducted or shut off, so that the first input voltage $V_{in1}$ is converted into a first internal output voltage $V_{o1}$ (a DC voltage).

The first output protection circuit 32 is interconnected between a power output terminal of the first output power circuit 31 and the power output terminal of the first power supply apparatus 3. According to the first internal output voltage $V_{o1}$ and the output voltage $V_o$, the first output protection circuit 32 determines whether the power input terminal and the power output terminal of the first output protection circuit 32 are conducted in order to limit the current direction. If the first output protection circuit 32 is in a conducted status, the electrical energy of the first internal output voltage $V_{o1}$ could be transmitted to the power output terminal of the first power supply apparatus 3 and the system circuit 2 through the first output protection circuit 32. If a short-circuit problem occurs at the power output terminal of the first output power circuit 31, the first output power circuit 31 has a breakdown or the first output power circuit 31 is disabled, the first internal output voltage $V_{o1}$ is greater than the output voltage $V_o$.

Under this circumstance, the first output protection circuit 32 is opened to assure that the output voltage $V_o$ is maintained at the rated voltage (e.g. 12V).

The first output capacitor $C_{o1}$ is interconnected between the power output terminal of the first output power circuit 31 and a common terminal COM. The first pre-charging circuit 34 includes a first pre-charging resistor $R_{p1}$. The first pre-charging circuit 34 is interconnected between the power input terminal and the power output terminal of the first output protection circuit 32. In a case that the first output power circuit 31 is disabled or fails to provide electrical energy, the first pre-charging circuit 34 provides a first pre-charging path. At this moment, the second power supply apparatus 4 is enabled to provide electrical energy to the system circuit 2 such that the output voltage $V_o$ is maintained at the rated voltage. As such, the electrical energy of the output voltage $V_o$ will be previously charged into the first output capacitor $C_{o1}$ through the first pre-charging resistor $R_{p1}$. In such manner, the magnitude of the first internal output voltage $V_{o1}$ will be initially increased and greater than zero.

The first power supply control circuit 33 is connected to a control terminal of the first switching circuit 311, the power output terminal of the first output power circuit 31, the power supply system control circuit 5 and the logical control unit 6. According to the first power-on signal PSU_ON1, the first power supply control circuit 33 determines whether a first pulse width modulation signal $V_{PWM1}$ is transmitted to the control terminal of the first switching circuit 311, thereby controlling the on/off statuses of the first switching circuit 311. As such, the first switching circuit 311 generates the first internal output voltage $V_{o1}$ and the output voltage $V_o$ that have the rated voltages, thereby providing electrical energy to the system circuit 2. In addition, the first power supply apparatus 3 generates a first power status signal PS_OK1 indicating whether the first power supply apparatus 3 could normally provide electrical energy to the system circuit 2.

If the first power-on signal PSU_ON1 is in a disabled status, the first power supply control circuit 33 will stop transmitting the first pulse width modulation signal $V_{PWM1}$ to the control terminal of the first switching circuit 311. At the same time, the first switching circuit 311 is shut off, and the first output power circuit 31 fails to provide electrical energy to the system circuit 2. In addition, the first power status signal PS_OK1 generated by the first power supply control circuit 33 is in a disabled status. Under this circumstance, the first output protection circuit 32 is opened. Meanwhile, the voltage across the first output capacitor $C_{o1}$ or the first internal output voltage $V_{o1}$ is lower than the rated voltage. Since the electrical energy of the output voltage $V_o$ has been previously charged into the first output capacitor $C_{o1}$ through the first pre-charging resistor $R_{p1}$, the voltage across the first output capacitor $C_{o1}$ or the first internal output voltage $V_{o1}$ will be initially increased and greater than zero.

If the first power-on signal PSU_ON1 is switched from the disabled status to an enabled status, the first power supply control circuit 33 will transmit a first pulse width modulation signal $V_{PWM1}$ having a higher or the maximum duty cycle to the control terminal of the first switching circuit 311. As such, the first output power circuit 31 is enabled and the first internal output voltage $V_{o1}$ is quickly increased to the rated voltage. Meanwhile, the first output protection circuit 32 is switched from the opened status to the conducted status, so that the electrical energy of the first internal output voltage $V_{o1}$ is transmitted to the power output terminal of the first power supply apparatus 3 and the system circuit 2 through the first output protection circuit 32. In addition, the first power status signal PS_OK1 generated by the first power supply control circuit 33 is in an enabled status. It is meant that the first power supply apparatus 3 could normally provide electrical energy to the system circuit 2.

In this embodiment, the second power supply apparatus 4 comprises a second output power circuit 41, a second output protection circuit 42, a second output capacitor $C_{o2}$, a second power supply control circuit 44 and a second pre-charging circuit 44. The second output power circuit 41 includes a fifth switching circuit 411 for receiving the second input voltage $V_{in2}$. The fifth switching circuit 411 is alternately conducted or shut off, so that the second input voltage $V_{in2}$ is converted into a second internal output voltage $V_{o2}$ (a DC voltage).

The second output protection circuit 42 is interconnected between a power output terminal of the second output power circuit 41 and the power output terminal of the second power supply apparatus 4. According to the second internal output voltage $V_{o2}$ and the output voltage $V_o$, the second output protection circuit 42 determines whether the power input terminal and the power output terminal of the second output protection circuit 42 are conducted in order to limit the current direction. If the second output protection circuit 42 is in a conducted status, the electrical energy of the second internal output voltage $V_{o2}$ could be transmitted to the power output terminal of the second power supply apparatus 4 and the system circuit 2 through the second output protection circuit 42. If a short-circuit problem occurs at the power output terminal of the second output power circuit 41, the second output power circuit 41 has a breakdown or the second output power circuit 41 is disabled, the second internal output voltage $V_{o2}$ is greater than the output voltage $V_o$. Under this circumstance, the second output protection circuit 42 is opened to assure that the output voltage $V_o$ is maintained at the rated voltage.

The second output capacitor $C_{o2}$ is interconnected between the power output terminal of the second output power circuit 41 and a common terminal COM. The second pre-charging circuit 44 includes a second pre-charging resistor $R_{p2}$. The second pre-charging circuit 44 is interconnected between the power input terminal and the power output terminal of the second output protection circuit 42. In a case that the second output power circuit 41 is disabled or fails to provide electrical energy, the second pre-charging circuit 44 provides a second pre-charging path. At this moment, the first power supply apparatus 3 is enabled to provide electrical energy to the system circuit 2 such that the output voltage $V_o$ is maintained at the rated voltage. As such, the electrical energy of the output voltage $V_o$ will be previously charged into the second output capacitor $C_{o2}$ through the second pre-charging resistor $R_{p2}$. In such manner, the magnitude of the second internal output voltage $V_{o2}$ will be initially increased and greater than zero.

The second power supply control circuit 43 is connected to a control terminal of the fifth switching circuit 411, the power output terminal of the second output power circuit 41, the power supply system control circuit 5 and the logical control unit 6. According to the second power-on signal PSU_ON2, the second power supply control circuit 43 determines whether a second pulse width modulation signal $V_{PWM2}$ is transmitted to the control terminal of the fifth switching circuit 411, thereby controlling the on/off statuses of the fifth switching circuit 411. As such, the fifth switching circuit 411 generates the second internal output voltage $V_{o2}$ and the output voltage $V_o$ that have the rated voltages, thereby providing electrical energy to the system circuit 2. In addition, the second power supply apparatus 4 generates a second power status signal PS_OK2 indicating whether the second power supply apparatus 4 could normally provide electrical energy to the system circuit 2.

If the second power-on signal PSU_ON2 is in a disabled status, the second power supply control circuit 43 will stop transmitting the second pulse width modulation signal $V_{PWM2}$ to the control terminal of the fifth switching circuit 411. At the same time, the fifth switching circuit 411 is shut off, and the second output power circuit 41 fails to provide electrical energy to the system circuit 2. In addition, the second power status signal PS_OK2 generated by the second power supply control circuit 43 is in a disabled status. Under this circumstance, the second output protection circuit 42 is opened. Meanwhile, the voltage across the second output capacitor $C_{o2}$ or the second internal output voltage $V_{o2}$ is lower than the rated voltage. Since the electrical energy of the output voltage $V_o$ has been previously charged into the second output capacitor $C_{o2}$ through the second pre-charging resistor $R_{p2}$, the voltage across the second output capacitor $C_{o2}$ or the second internal output voltage $V_{o2}$ will be initially increased and greater than zero.

If the second power-on signal PSU_ON2 is switched from the disabled status to an enabled status, the second power supply control circuit 43 will transmit a second pulse width modulation signal $V_{PWM2}$ having a higher or the maximum duty cycle to the control terminal of the fifth switching circuit 41. As such, the second output power circuit 41 is enabled and the second internal output voltage $V_{o2}$ is quickly increased to the rated voltage. Meanwhile, the second output protection circuit 42 is switched from the opened status to the conducted status, so that the electrical energy of the second internal output voltage $V_{o2}$ is transmitted to the power output terminal of the second power supply apparatus 4 and the system circuit 2 through the second output protection circuit 42. In addition, the second power status signal PS_OK2 generated by the second power supply control circuit 43 is in an enabled status. It is meant that the second power supply apparatus 4 could normally provide electrical energy to the system circuit 2.

In some embodiment, either the first input voltage $V_{in1}$ is inputted into the first power supply apparatus 3 or the second input voltage $V_{in2}$ is inputted into the second power supply apparatus 4. The operating principles are identical to those illustrated above, and are not redundantly described herein.

Figure 2A:
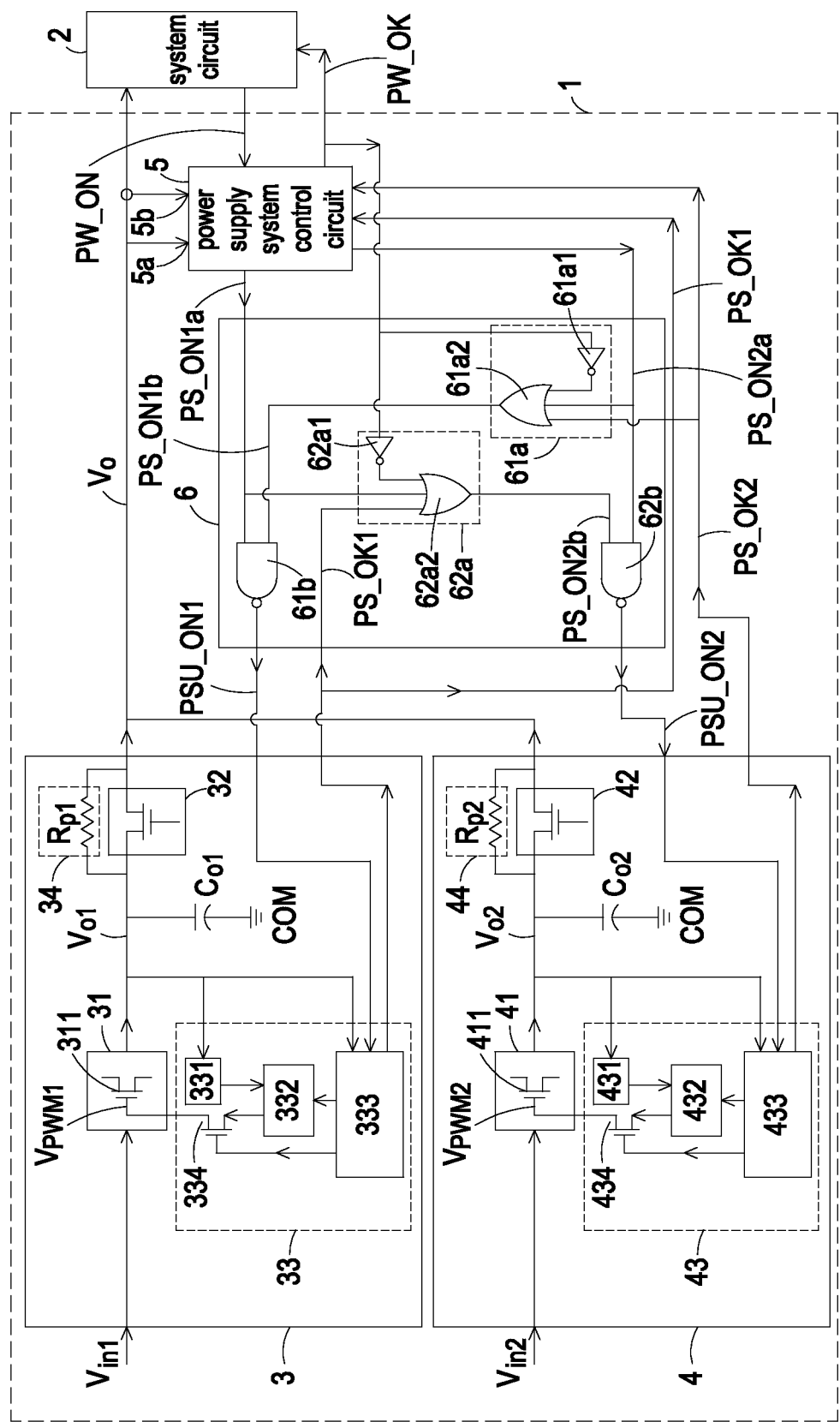
FIG. 2A is a schematic detailed circuit diagram illustrating an exemplary power supply system of FIG. 1.

FIG. 2A is a schematic detailed circuit diagram illustrating an exemplary power supply system of FIG. 1. As shown in FIG. 2A, the logical control unit 6 comprises a first main determination circuit 61a, a first minor determination circuit 61b, a second main determination circuit 62a and a second minor determination circuit 62b.

The first main determination circuit 61a includes a first NOT logic gate 61a1 and a first OR logic gate 61a2. The input terminal of the first NOT logic gate 61a1 is connected to the power supply system control circuit 5. The output terminal of the first NOT logic gate 61a1 is connected to an input terminal of the first OR logic gate 61a2. The other two input terminals of the first OR logic gate 61a2 are respectively connected to the second power supply control circuit 43 of the second power supply apparatus 4 and the power supply system control circuit 5. The output terminal of the first OR logic gate 61a2 is connected to the first minor determination circuit 61b.

According to the second power status signal PS_OK2, the second main switch-on signal PS_ON2a and the system power status signal PW_OK, the first main determination circuit 61a generates a first minor switch-on signal PS_ON1b to the first minor determination circuit 61b. According to the first minor switch-on signal PS_ON1b, the first minor determination circuit 61b determines whether the first power supply apparatus 3 needs to be immediately enabled to provide electrical energy to the system circuit 2.

The first minor determination circuit 61b is a first NAND logic gate. The two input terminals of the first NAND logic gate 61b are respectively connected to the power supply system control circuit 5 and the output terminal of the first OR logic gate 61a2. According to the first main switch-on signal PS_ON1a in the enabled status or the first minor switch-on signal PS_ON1b in the enabled status, the first minor determination circuit 61b determines whether the first power-on signal PSU_ON1 is in the enabled state to enable the first power supply apparatus 3 to provide electrical energy to the system circuit 2.

In some embodiments, the first minor determination circuit 61b is disposed within the first power supply apparatus 3. Similarly, according to the first main switch-on signal PS_ON1a in the enabled status or the first minor switch-on signal PS_ON1b in the enabled status, the first minor determination circuit 61b determines whether the first power-on signal PSU_ON1 is in the enabled state to enable the first power supply apparatus 3 to provide electrical energy to the system circuit 2.

The second main determination circuit 62a includes a second NOT logic gate 62a1 and a second OR logic gate 62a2. The input terminal of the second NOT logic gate 62a1 is connected to the power supply system control circuit 5. The output terminal of the second NOT logic gate 62a1 is connected to an input terminal of the second OR logic gate 62a2. The other two input terminals of the second OR logic gate 62a2 are respectively connected to the second power supply control circuit 43 of the second power supply apparatus 4 and the power supply system control circuit 5. The output terminal of the second OR logic gate 62a2 is connected to the second minor determination circuit 62b.

According to the first power status signal PS_OK1, the first main switch-on signal PS_ON1a and the system power status signal PW_OK, the second main determination circuit 62a generates a second minor switch-on signal PS_ON2b to the second minor determination circuit 62b. According to the second minor switch-on signal PS_ON2b, the second minor determination circuit 62b determines whether the second power supply apparatus 4 needs to be immediately enabled to provide electrical energy to the system circuit 2.

The second minor determination circuit 62b is a second NAND logic gate. The two input terminals of the second NAND logic gate 62b are respectively connected to the power supply system control circuit 5 and the output terminal of the second OR logic gate 62a2. According to the second main switch-on signal PS_ON2a in the enabled status or the second minor switch-on signal PS_ON2b in the enabled status, the second minor determination circuit 62b determines whether the second power-on signal PSU_ON2 is in the enabled state to enable the second power supply apparatus 4 to provide electrical energy to the system circuit 2.

In some embodiments, the second minor determination circuit 62b is disposed within the second power supply apparatus 4. Similarly, according to the second main switch-on signal PS_ON2a in the enabled status or the second minor switch-on signal PS_ON2b in the enabled status, the second minor determination circuit 62b determines whether the second power-on signal PSU_ON2 is in the enabled state to enable the second power supply apparatus 4 to provide electrical energy to the system circuit 2.

In this embodiment, the first power supply control circuit 33 comprises a first feedback circuit 331, a first output power control circuit 332, a first micro-controller 333 and a second switching circuit 334. The second power supply control circuit 43 comprises a second feedback circuit 431, a second output power control circuit 432, a second micro-controller 433 and a sixth switching circuit 434.

Figure 2C:
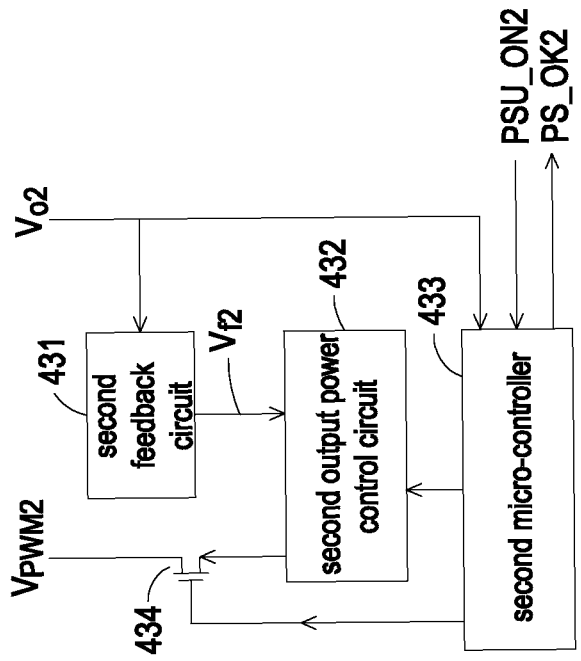
FIG. 2C is a schematic detailed circuit diagram illustrating the second power supply control circuit of the power supply system of FIG. 2A.
Figure 2B:
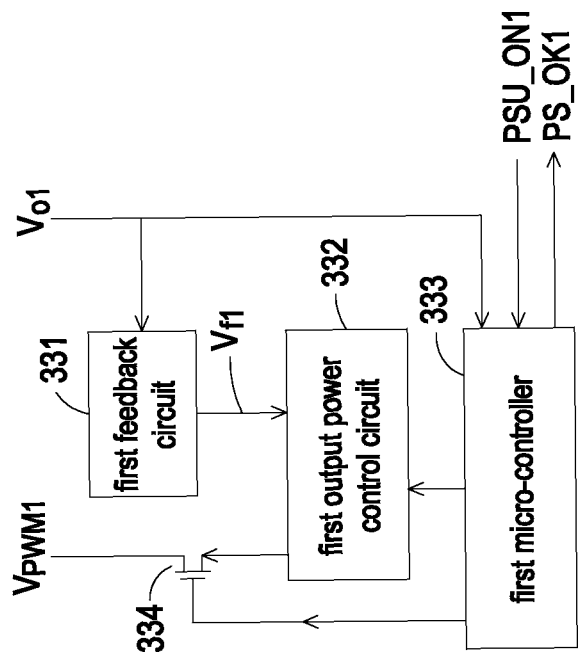
FIG. 2B is a schematic detailed circuit diagram illustrating the first power supply control circuit of the power supply system of FIG. 2A.

FIG. 2B is a schematic detailed circuit diagram illustrating the first power supply control circuit of the power supply system of FIG. 2A. As shown in FIG. 2B, the first feedback circuit 331 is connected to the power output terminal of the first output power circuit 31 and the first output power control circuit 332. According to the first internal output voltage $V_{o1}$, the first feedback circuit 331 generates a first feedback signal $V_{f1}$ to the first output power control circuit 332.

The first output power control circuit 332 is connected to the first feedback circuit 331, the first micro-controller 333 and the second switching circuit 334. According to the first feedback signal $V_{f1}$, the first output power control circuit 332 generates a corresponding first pulse width modulation signal $V_{PWM1}$, which is transmitted to the control terminal of the first switching circuit 311 through the second switching circuit 334. According to the first pulse width modulation signal $V_{PWM1}$, the first switching circuit 311 is alternately conducted or shut off, so that the first output power circuit 31 outputs the first internal output voltage $V_{o1}$ and the output voltage $V_o$ having the rated voltages to the system circuit 2.

The second switching circuit 334 is interconnected between the control terminal of the first switching circuit 311 and the first output power control circuit 332. The second switching circuit 334 is conducted or shut off under control of the first micro-controller 333. When the second switching circuit 334 is conducted, the first pulse width modulation signal $V_{PWM1}$ will be transmitted to the control terminal of the first switching circuit 311 through the second switching circuit 334.

The first micro-controller 333 is connected to a control terminal of the second switching circuit 334, the first output power control circuit 332, the power output terminal of the first output power circuit 31, the power supply system control circuit 5 and the logical control unit 6. According to the first power-on signal PSU_ON1, the first micro-controller 333 controls the operations of the first output power control circuit 332 and the on/off statuses of the second switching circuit 334. In a case that the first power supply apparatus 3 normally provides electrical energy to the system circuit 2, the first micro-controller 333 generates the first power status signal PS_OK1 in the enabled status to the power supply system control circuit 5 and the logical control unit 6.

FIG. 2C is a schematic detailed circuit diagram illustrating the second power supply control circuit of the power supply system of FIG. 2A. As shown in FIG. 2C, the second feedback circuit 431 is connected to the power output terminal of the second output power circuit 41 and the second output power control circuit 432. According to the second internal output voltage $V_{o2}$, the second feedback circuit 431 generates a second feedback signal $V_{f2}$ to the second output power control circuit 432.

The second output power control circuit 432 is connected to the second feedback circuit 431, the second micro-controller 433 and the sixth switching circuit 434. According to the second feedback signal $V_{f2}$, the second output power control circuit 432 generates a corresponding second pulse width modulation signal $V_{PWM2}$, which is transmitted to the control terminal of the fifth switching circuit 411 through the sixth switching circuit 434. According to the second pulse width modulation signal $V_{PWM2}$, the fifth switching circuit 411 is alternately conducted or shut off, so that the second output power circuit 41 outputs the second internal output voltage $V_{o2}$ and the output voltage $V_o$ having the rated voltages to the system circuit 2.

The sixth switching circuit 434 is interconnected between the control terminal of the fifth switching circuit 411 and the second output power control circuit 432. The sixth switching circuit 434 is conducted or shut off under control of the second micro-controller 433. When the sixth switching circuit 434 is conducted, the second pulse width modulation signal $V_{PWM2}$ will be transmitted to the control terminal of the fifth switching circuit 411 through the sixth switching circuit 434.

The second micro-controller 433 is connected to a control terminal of the sixth switching circuit 434, the second output power control circuit 432, the power output terminal of the second output power circuit 41, the power supply system control circuit 5 and the logical control unit 6. According to the second power-on signal PSU_ON2, the second micro-controller 433 controls the operations of the second output power control circuit 432 and the on/off statuses of the sixth switching circuit 434. In a case that the second power supply apparatus 4 normally provides electrical energy to the system circuit 2, the second micro-controller 433 generates the second power status signal PS_OK2 in the enabled status to the power supply system control circuit 5 and the logical control unit 6.

Figure 3:
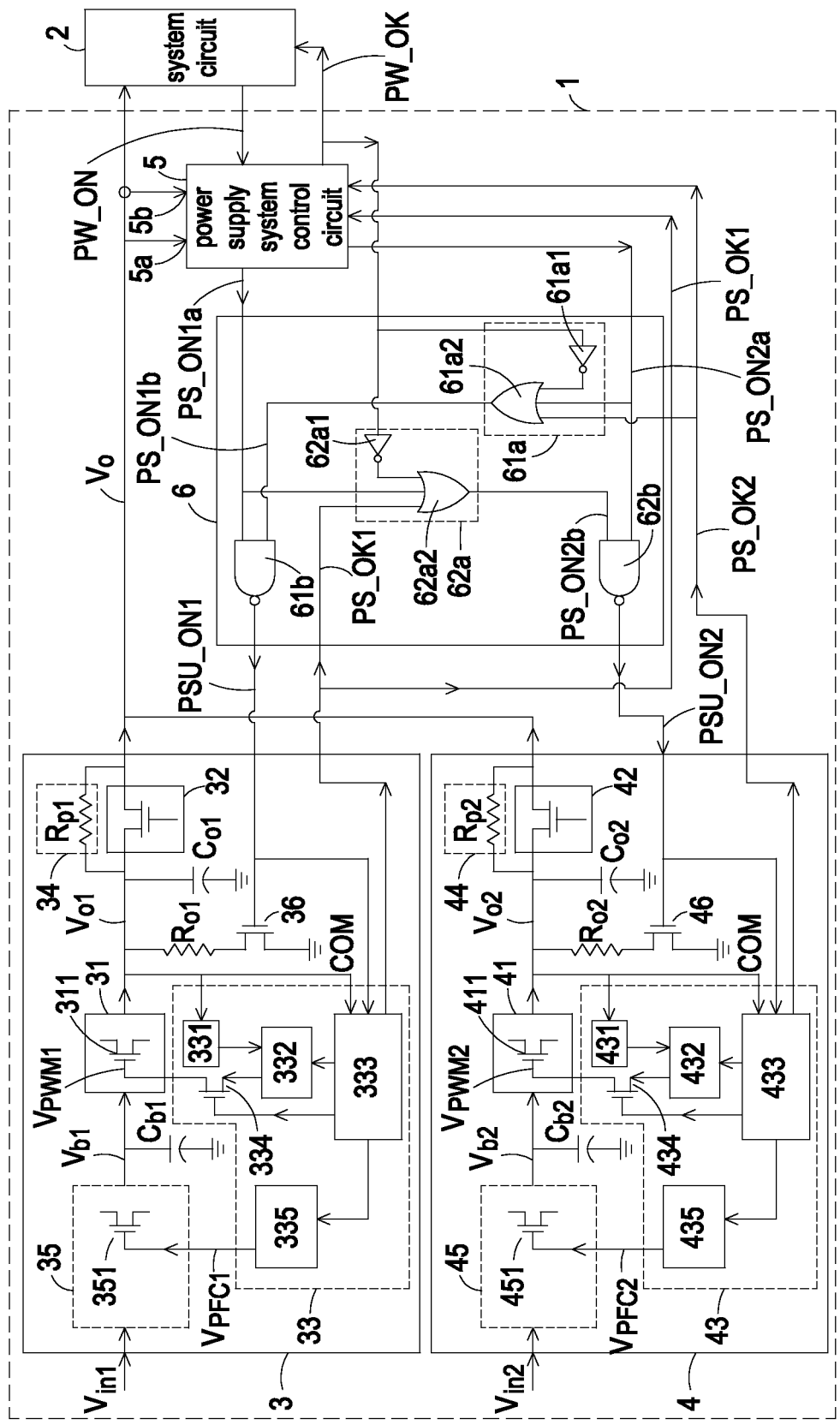
FIG. 3 is a schematic detailed circuit diagram illustrating another exemplary power supply system of FIG. 1.

FIG. 3 is a schematic detailed circuit diagram illustrating another exemplary power supply system of FIG. 1. In comparison with FIG. 2, the first power supply apparatus 3 of FIG. 3 further comprises a first output resistor $R_{o1}$ (a dummy load), a third switching circuit 36, a first bus capacitor $C_{b1}$, a first input power circuit 35 and a first input power control circuit 335. In addition, the second power apparatus 4 further comprises a second output resistor $R_{o2}$, a seventh switching circuit 46, a second bus capacitor $C_{b2}$, a second input power circuit 45 and a second input power control circuit 435.

As shown in FIG. 3, the first output resistor $R_{o1}$ and the third switching circuit 36 are serially connected between the power output terminal of the first output power circuit 31 and the common terminal COM. The control terminal of the third switching circuit 36 is connected to the output terminal of the first minor determination circuit 61b. If the first switching circuit 311 is conducted and the first power supply apparatus 3 provides electrical energy to the system circuit 2, the third switching circuit 36 is conducted according to the first power-on signal PSU_ON1 in the enabled status. In other words, the first output resistor $R_{o1}$ is connected between the power output terminal of the first output power circuit 31 and the common terminal COM, so that the first output power circuit 31 could be stably operated. On the other hand, if the first power supply apparatus 3 stops providing electrical energy to the system circuit 2, the third switching circuit 36 is shut off according to the first power-on signal PSU_ON1 in the disabled status. As such, the electrical energy of the output voltage $V_o$ will be previously charged into the first output capacitor $C_{o1}$ through the first pre-charging resistor $R_{p1}$. In such manner, the magnitude of the first internal output voltage $V_{o1}$ will be initially increased and greater than zero.

The first input power circuit 35 comprises a fourth switching circuit 351. The power output terminal of the first input power circuit 35 is connected to the power input terminal of the first output power circuit 31. That is, the first input power circuit 35 is interconnected between the power input terminal of the first power supply apparatus 3 and the power input terminal of the first output power circuit 31. By the first input power circuit 35, the first input voltage $V_{in1}$ (an AC voltage) is converted into a first bus voltage $V_{b1}$ (a DC voltage).

In this embodiment, the first power supply control circuit 33 further comprises the first input power control circuit 335. The first input power control circuit 335 is connected to the control terminal of the fourth switching circuit 351 and the first micro-controller 333 for generating a first power factor correction signal $V_{PFC1}$ to the control terminal of the fourth switching circuit 351. As such, the first power supply apparatus 3 is operated at a high power factor correction. The first bus capacitor $C_{b1}$ is interconnected between the power input terminal of the first output power circuit 31 and the common terminal COM for storing electrical energy.

The second output resistor $R_{o2}$ and the seventh switching circuit 46 are serially connected between the power output terminal of the second output power circuit 41 and the common terminal COM. The control terminal of the seventh switching circuit 46 is connected to the output terminal of the second minor determination circuit 62b. If the second switching circuit 411 is conducted, the seventh switching circuit 46 is conducted according to the second power-on signal PSU_ON2 in the enabled status. In other words, the second output resistor $R_{o2}$ is connected between the power output terminal of the second output power circuit 41 and the common terminal COM, so that the second output power circuit 41 could be stably operated. On the other hand, if the second power supply apparatus 4 stops providing electrical energy to the system circuit 2, the seventh switching circuit 46 is shut off according to the second power-on signal PSU_ON2 in the disabled status. As such, the electrical energy of the output voltage $V_o$ will be previously charged into the second output capacitor $C_{o2}$ through the second pre-charging resistor $R_{p2}$. In such manner, the magnitude of the second internal output voltage $V_{o2}$ will be initially increased and greater than zero.

The second input power circuit 45 comprises an eighth switching circuit 451. The power output terminal of the second input power circuit 45 is connected to the power input terminal of the second output power circuit 41. That is, the second input power circuit 45 is interconnected between the power input terminal of the second power supply apparatus 4 and the power input terminal of the second output power circuit 41. By the second input power circuit 45, the second input voltage $V_{in2}$ (an AC voltage) is converted into a second bus voltage $V_{b2}$ (a DC voltage).

In this embodiment, the second power supply control circuit 43 further comprises the second input power control circuit 435. The second input power control circuit 435 is connected to the control terminal of the eighth switching circuit 451 and the second micro-controller 433 for generating a second power factor correction signal $V_{PFC2}$ to the control terminal of the eighth switching circuit 451. As such, the second power supply apparatus 4 is operated at a high power factor correction. The second bus capacitor $C_{b2}$ is interconnected between the power input terminal of the second output power circuit 41 and the common terminal COM for storing electrical energy.

If the electricity consumption amount of the system circuit 2 is greater than the rated electricity supply amount of the first power supply apparatus 3 or the second power supply apparatus 4, it is meant that one of the first power supply apparatus 3 and the second power supply apparatus 4 fails to provide sufficient electrical energy to the system circuit 2. Meanwhile, the first main switch-on signal PS_ON1a and the second main switch-on signal PS_ON2a generated by the power supply system control circuit 5 are in the enabled statuses, and the first power-on signal PSU_ON1 and the second power-on signal PSU_ON2 generated by the logical control unit 6 are also in the enabled statuses. As a consequence, the first power supply apparatus 3 and the second power supply apparatus 4 are simultaneously enabled to provide electrical energy to the system circuit 2.

On the other hand, if the electricity consumption amount of the system circuit 2 is smaller than the rated electricity supply amount of the first power supply apparatus 3 or the second power supply apparatus 4, it is meant that either the first power supply apparatus 3 or the second power supply apparatus 4 could provide sufficient electrical energy to the system circuit 2. Meanwhile, one of the first main switch-on signal PS_ON1a and the second main switch-on signal PS_ON2a generated by the power supply system control circuit 5 is in the enabled status but the other is in the disabled status, and one of the first power-on signal PSU_ON1 and the second power-on signal PSU_ON2 generated by the logical control unit 6 is in the enabled status but the other is in the disabled status. As a consequence, either the first power supply apparatus 3 or the second power supply apparatus 4 is enabled to provide electrical energy to the system circuit 2.

On the other hand, if the first power supply apparatus 3 stops providing electrical energy to the system circuit 2, according to the first power-on signal PSU_ON1 in the disabled status, the third switching circuit 36 is shut off, the second switching circuit 334 is shut off and the first output protection circuit 32 is opened. As such, the first pulse width modulation signal $V_{PWM1}$ generated by the first output power control circuit 332 fails to be transmitted to the control terminal of the first switching circuit 311. Meanwhile, the first switching circuit 311 is shut off. The electrical energy of the output voltage $V_o$ will be previously charged into the first output capacitor $C_{o1}$ through the first pre-charging resistor $R_{p1}$. In such manner, the magnitude of the first internal output voltage $V_{o1}$ will be initially increased and greater than zero. Although the first internal output voltage $V_{o1}$ has been increased to a magnitude greater than zero, the first internal output voltage $V_{o1}$ is still lower than the rated voltage. By a feedback compensation circuit (not shown) of the first output power control circuit 332, the duty cycle of the first pulse width modulation signal $V_{PWM1}$ will be adjusted to a higher value or the maximum value. An example of the feedback compensation circuit includes a proportional-integral (PI) circuit, a proportional-integral-differential (PID) circuit or a proportional-differential (PD) circuit.

Under control of the first micro-controller 333, according to the first power-on signal PSU_ON1 in the enabled status, the first input power control circuit 335 intermittently generates the first power factor correction signal $V_{PFC1}$ in a pulse skipping mode, a burst mode or an off-time modulation mode. As such, the power consumption of the first input power circuit 35 is reduced. For example, since the switch loss of the fourth switching circuit 351 is reduced, the overall efficiency of the power supply system is enhanced. Moreover, the first bus voltage $V_{b1}$ is greater than zero or maintained at the rated voltage.

On the other hand, if the second power supply apparatus 4 stops providing electrical energy to the system circuit 2, according to the second power-on signal PSU_ON2 in the disabled status, the seventh switching circuit 46 is shut off, the sixth switching circuit 434 is shut off and the second output protection circuit 42 is opened. As such, the second pulse width modulation signal $V_{PWM2}$ generated by the second output power control circuit 432 fails to be transmitted to the control terminal of the fifth switching circuit 411. Meanwhile, the fifth switching circuit 411 is shut off. The electrical energy of the output voltage $V_o$ will be previously charged into the second output capacitor $C_{o2}$ through the second pre-charging resistor $R_{p2}$. In such manner, the magnitude of the second internal output voltage $V_{o2}$ will be initially increased and greater than zero. Although the second internal output voltage $V_{o2}$ has been increased to a magnitude greater than zero, the second internal output voltage $V_{o2}$ is still lower than the rated voltage. By a feedback compensation circuit (not shown) of the second output power control circuit 432, the duty cycle of the second pulse width modulation signal $V_{PWM2}$ will be adjusted to a higher value or the maximum value.

Under control of the first micro-controller 433, according to the second power-on signal PSU_ON2 in the enabled status, the second input power control circuit 435 intermittently generates the second power factor correction signal $V_{PFC2}$. As such, the power consumption of the second input power circuit 45 is reduced. For example, since the switch loss of the eighth switching circuit 451 is reduced, the overall efficiency of the power supply system 1 is enhanced.

In an embodiment, one of the first power supply apparatus 3 and the second power supply apparatus 4 provides electrical energy to the system circuit 2. In a case that the first input voltage $V_{in1}$ or the second input voltage $V_{in2}$ is abnormal or interrupted, the first power supply apparatus 3 or the second power supply apparatus 4 that is originally enabled fails to continuously provide electrical energy to the system circuit 2. As such, the first power status signal PS_OK1 or the second power status signal PS_OK2 is switched from an enabled status to a disabled status. At this moment, according to the first power status signal PS_OK1 or the second power status signal PS_OK2 in the disabled status, the first main determination circuit 61a or the second main determination circuit 62a will immediately switch the first minor switch-on signal PS_ON1b or the second minor switch-on signal PS_ON2b from the disabled status to the enabled status. Next, the first minor determination circuit 61b or the second minor determination circuit 62b will switch the first power-on signal PSU_ON1 or the second power-on signal PSU_ON2 from the disabled status to the enabled status. According to the first power-on signal PSU_ON1 or the second power-on signal PSU_ON2 in the enabled status, the first power supply apparatus 3 or the second power supply apparatus 4 that is originally disabled will be enabled to provide electrical energy to the system circuit 2. After a certain time period, the power supply system control circuit 5 will switch the first main switch-on signal PS_ON1a or the second main switch-on signal PS_ON2a from the disabled status to the enabled status according to the first power status signal PS_OK1 or the second power status signal PS_OK2 in the disabled status.

For example, if the electricity consumption amount of the system circuit 2 is smaller than the rated electricity supply amount of the first power supply apparatus 3, it is meant that the first power supply apparatus 3 could provide sufficient electrical energy to the system circuit 2. Meanwhile, the first main switch-on signal PS_ON1a and the second main switch-on signal PS_ON2a generated by the power supply system control circuit 5 are respectively in the enabled status and the disabled status. According to the first main switch-on signal PS_ON1a in the enabled status and the second main switch-on signal PS_ON2a in the disabled status, the first power-on signal PSU_ON1 and the second power-on signal PSU_ON2 generated by the logical control unit 6 are respectively in the enabled status and the disabled status. As a consequence, the first power supply apparatus 3 is enabled to provide electrical energy to the system circuit 2 but the second power supply apparatus 4 is disabled.

In an embodiment, the first power supply apparatus 3 is originally enabled to provide electrical energy to the system circuit 2. In a case that the first input voltage $V_{in1}$ is abnormal or interrupted, the first power supply apparatus 3 fails to continuously provide electrical energy to the system circuit 2. As such, the first power status signal PS_OK1 is switched from an enabled status to a disabled status. Since the second main determination circuit 62a has a higher response speed, the second main determination circuit 62a will immediately switch the second minor switch-on signal PS_ON2b from the disabled status to the enabled status according to the first power status signal PS_OK1 in the disabled status. Then, according to the second minor switch-on signal PS_ON2b in the enabled status, the second minor determination circuit 62b will switch the second power-on signal PSU_ON2 from the disabled status to the enabled status. According to the second power-on signal PSU_ON2 in the enabled status, the second power supply apparatus 4 that is originally disabled will be enabled to provide electrical energy to the system circuit 2.

In a case that the second power supply apparatus 4 fails to provide electrical energy to the system circuit 2, the second output power control circuit 432 will generate a second pulse width modulation signal $V_{PWM2}$ having a higher or the maximum duty cycle. Since the second internal output voltage $V_{o2}$ and the second bus voltage $V_{b2}$ are not zero, the first output power circuit 31 and the first input power circuit 35 could be quickly initiated. As such, the second power supply apparatus 4 could provide electrical energy to the system circuit 2 in a faster speed. That is, the power supply system could continuously provide sufficient electrical energy to the system circuit 2. After a certain time period, the power supply system control circuit 5 will switch the second main switch-on signal PS_ON2a from the disabled status to the enabled status according to the first power status signal PS_OK1.

In this embodiment, the enabled statuses of the first power-on signal PSU_ON1, the second power-on signal PSU_ON2, the first power status signal PS_OK1, the second power status signal PS_OK2, the first main switch-on signal PS_ON1a, the second main switch-on signal PS_ON2a, the first minor switch-on signal PS_ON1b and the second minor switch-on signal PS_ON2b are high, high, high, high, low, low, low and low voltage levels, respectively. Whereas, the disabled statuses of the first power-on signal PSU_ON1, the second power-on signal PSU_ON2, the first power status signal PS_OK1, the second power status signal PS_OK2, the first main switch-on signal PS_ON1a, the second main switch-on signal PS_ON2a, the first minor switch-on signal PS_ON1b and the second minor switch-on signal PS_ON2b are low, low, low, low, high, high, high and high voltage levels, respectively.

Each of the first power supply control circuit 33, the second power supply control circuit 43 and the power supply system control circuit 5 includes but is not limited to a digital signal processor (DSP) or a micro processor. Each of the first output power control circuit 332 and the second output power control circuit 432 includes but is not limited to a pulse width modulation (PWM) controller or a pulse frequency modulation (PFM) controller. Each of the power supply system control circuit 5 and the first micro-controller 333 includes but is not limited to a microcontroller unit or a digital signal processor (DSP). Each of the first input power control circuit 335 and the second input power control circuit 435 includes but is not limited to a pulse frequency modulation (PFM) controller. Moreover, each of the switching circuits used in the present invention includes but is not limited to a metal oxide semiconductor field effect transistor (MOSFET) or a bipolar junction transistor (BJT).

From the above description, the power supply apparatus of the present invention has a fast initiating speed. As a consequence, multiple power supply apparatuses of the present invention could be integrated into a power supply system. Due to the high initiating speeds of the power supply apparatuses, some of the power supply apparatuses are selectively disabled but some of the power supply apparatuses are enabled to provide electrical energy to the system circuit. Under this circumstance, the operating efficiency of each power supply apparatuses and the overall operating efficiency of the power supply system are enhanced. In a case that one or more power supply apparatuses have a breakdown, the power supply system still provides sufficient electrical energy to the electronic device because the logical control unit has a faster response speed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply apparatus for receiving a first input voltage and generating an output voltage to a system circuit, said power supply apparatus comprising:
   a first output power circuit including a first switching circuit for receiving said first input voltage, wherein said first switching circuit is alternately conducted or shut off, so that said first input voltage is converted into a first internal output voltage;
   a first output protection circuit connected to a power output terminal of said first output power circuit for limiting a current direction, wherein an electrical energy of said first internal output voltage is transmitted to said system circuit through said first output protection circuit;
   a first output capacitor connected to said power output terminal of said first output power circuit;
   a first pre-charging circuit interconnected between a power input terminal and a power output terminal of said first output protection circuit for providing a first pre-charging path; and
   a first power supply control circuit connected to a control terminal of said first switching circuit and said power output terminal of said first output power circuit for determining whether a first pulse width modulation signal is transmitted to said control terminal of said first switching circuit according to a first power-on signal, wherein when said first power-on signal is switched from a disabled status to an enabled status, a first pulse width modulation signal having a maximum duty cycle is transmitted from said first power supply control circuit to said control terminal of said first switching circuit, thereby enabling said first output power circuit,
   wherein said first power supply control circuit comprises:
      a first feedback circuit connected to said power output terminal of said first output power circuit for generating a first feedback signal according to said first internal output voltage; and
      a first micro-controller connected to a control terminal of a second switching circuit of said first power supply control circuit, a first output power control circuit of said first power supply control circuit and said power output terminal of said first output power circuit, wherein said first micro-controller controls operations of said first output power control circuit and on/off statuses of said second switching circuit according to said first power-on signal.

2. The power supply apparatus according to claim 1 further comprising a first output resistor and a third switching circuit, which are serially connected between said power output terminal of said first output power circuit and a common terminal, wherein if said first power-on signal in an enabled status is transmitted to said third switching circuit, said third switching circuit is conducted, so that said first output resistor is connected between said power output terminal of said first output power circuit and said common terminal.

3. The power supply apparatus according to claim 2 further comprising a first bus capacitor, which is interconnected between a power input terminal of said first output power circuit and said common terminal for storing electrical energy.

4. The power supply apparatus according to claim 1 wherein said first power supply control circuit comprises:
   said first output power control circuit connected to said first feedback circuit for generating said first pulse width modulation signal according to said first feedback signal; and
   said second switching circuit interconnected between said control terminal of said first switching circuit and said first output power control circuit, wherein when said second switching circuit is conducted, said first pulse width modulation signal is transmitted to said control terminal of said first switching circuit through said second switching circuit, and said first switching circuit is alternately conducted or shut off according to said first pulse width modulation signal, so that said first output power circuit outputs said first internal output voltage and said output voltage having rated voltages to said system circuit.

5. The power supply apparatus according to claim 1 wherein when said power supply apparatus provides electrical energy to said system circuit, said first micro-controller of said first power supply control circuit generates said first power status signal in an enabled status.

6. The power supply apparatus according to claim 1 further comprising a first input power circuit, which comprises a fourth switching circuit, wherein an power output terminal of the first input power circuit is connected to a power input terminal of said first output power circuit, and said first input voltage is converted into a first bus voltage by said first input power circuit.

7. The power supply apparatus according to claim 6 wherein said first power supply control circuit includes a first input power control circuit, which is connected to a control terminal of said fourth switching circuit and said first micro-controller for generating a first power factor correction signal to said control terminal of said fourth switching circuit.

8. The power supply apparatus according to claim 7 wherein under control of said first micro-controller, according to said first power-on signal in said enabled status, said first input power control circuit generates said first power factor correction signal, so that said first bus voltage is greater than zero or maintained at a rated voltage.

9. The power supply apparatus according to claim 1 wherein said first output protection circuit determines whether said power input terminal and said power output terminal of said first output protection circuit are conducted according to said first internal output voltage and said output voltage.

10. The power supply apparatus according to claim 1 wherein said first pre-charging circuit includes a first pre-charging resistor, and said first pre-charging circuit provides a first pre-charging path according to said first power-on signal in said enabled status, wherein electrical energy of said output voltage is previously charged into said first output capacitor through said first pre-charging resistor, so that said first internal output voltage is initially increased and greater than zero.

11. The power supply apparatus according to claim 1 further comprising a first minor determination circuit, which is connected to said first power supply control circuit, wherein first minor determination circuit determines whether said first power-on signal is in said enabled state to enable said power supply apparatus to provide electrical energy to said system circuit according to a first main switch-on signal in an enabled status or a first minor switch-on signal in an enabled status.

12. A power supply system having multiple power supply apparatuses for receiving a first input voltage and/or a second input voltage and generating an output voltage to a system circuit, said power supply system comprising:
a first power supply apparatus having an output terminal connected with said system circuit, wherein said first power supply apparatus generates said output voltage to said system circuit according to a first power-on signal, and generates a first power status signal corresponding to said first power-on signal;
a second power supply apparatus having an output terminal connected with said system circuit, wherein said second power supply apparatus generates said output voltage to said system circuit according to a second power-on signal, and generates a second power status signal corresponding to said second power-on signal;
a power supply system control circuit connected with said first power supply apparatus, said second power supply apparatus and said system circuit for generating a first main switch-on signal and a second main switch-on signal according to said first power status signal and said second power status signal, thereby controlling transmission of electrical energy from said first power supply apparatus and said second power supply apparatus to said system circuit, and generating a system power status signal; and
a logical control unit connected with said first power supply apparatus, said second power supply apparatus and said power supply system control circuit for generating said first power-on signal and said second power-on signal according to said first power status signal, said second power status signal, said first main switch-on signal, said second main switch-on signal and said system power status signal, thereby controlling transmission of electrical energy from said first power supply apparatus and said second power supply apparatus to said system circuit.

13. The power supply system according to claim 12 wherein said logical control unit has a faster response speed than said power supply system control circuit.

14. The power supply system according to claim 12 wherein said logical control unit is a non-time sequence combinational logic circuit, and said power supply system control circuit is a time sequence control circuit or a time sequence logic circuit.

15. The power supply system according to claim 12 wherein said power supply system control circuit generates said first main switch-on signal and said second main switch-on signal according to the electricity consumption amount of said system circuit, said first power status signal and said second power status signal, thereby determining whether said first power supply apparatus and said second power supply apparatus normally provide electrical energy to said system circuit and correspondingly generating said system power status signal.

16. The power supply system according to claim 15 wherein when the electricity consumption amount of said system circuit is greater than the rated electricity supply amount of said first power supply apparatus or said second power supply apparatus, said first main switch-on signal and said second main switch-on signal generated by said power supply system control circuit are in enabled statuses and said first power-on signal and said second power-on signal generated by said logical control unit are in enabled statuses, so that said first power supply apparatus and said second power supply apparatus are simultaneously enabled to provide electrical energy to said system circuit.

17. The power supply system according to claim 15 wherein when the electricity consumption amount of said system circuit is smaller than the rated electricity supply amount of said first power supply apparatus or said second power supply apparatus, one of said first main switch-on signal and said second main switch-on signal generated by said power supply system control circuit is in an enabled status but the other is in a disabled status, and one of said first power-on signal and said second power-on signal generated by said logical control unit is in an enabled status but the other is in a disabled status, so that either said first power supply apparatus or said second power supply apparatus is enabled to provide electrical energy to said system circuit.

18. The power supply system according to claim 17 wherein when said first power supply apparatus or said second power supply apparatus that is originally enabled fails to continuously provide electrical energy to said system circuit and said first power status signal or said second power status signal is correspondingly switched from an enabled status to a disabled status, said logical control unit immediately switches said first power-on signal or said second power-on signal from a disabled status to an enabled status, so that said first power supply apparatus or said second power supply apparatus that is originally disabled is enabled to provide electrical energy to said system circuit.

19. The power supply system according to claim 12 wherein said power supply system control circuit generates said system power status signal according to said first power status signal and said second power status signal, thereby determining whether said power supply system normal operates.

20. The power supply system according to claim 12 wherein said first input voltage is received by said first power supply apparatus and said second power supply apparatus, or said first input voltage and said second input voltage are respectively received by said first power supply apparatus and said second power supply apparatus.

21. The power supply system according to claim 12 wherein said logical control unit comprises:
a first main determination circuit connected to said power supply system control circuit and said second power supply apparatus for generating a first minor switch-on signal according to said second power status signal, said second main switch-on signal and said system power status signal;
a first minor determination circuit connected to an output terminal of said first main determination circuit, said power supply system control circuit and said first power supply apparatus, wherein said first minor determination circuit determines whether said first power-on signal is in an enabled state to enable said first power supply apparatus to provide electrical energy to said system circuit according to said first main switch-on signal in an enabled status or said first minor switch-on signal in said enabled status;

a second main determination circuit connected to said power supply system control circuit and said first power supply apparatus for generating a second minor switch-on signal according to said first power status signal, said first main switch-on signal and said system power status signal; and a second minor determination circuit connected to an output terminal of said second main determination circuit, said power supply system control circuit and said second power supply apparatus, wherein said second minor determination circuit determines whether said second power-on signal is in an enabled state to enable said second power supply apparatus to provide electrical energy to said system circuit according to said second main switch-on signal in an enabled status or said second minor switch-on signal in said enabled status.

22. The power supply system according to claim 12 wherein said first power supply apparatus comprises a first minor determination circuit, and said second power supply apparatus comprises a second minor determination circuit.

23. The power supply system according to claim 12 wherein said first power supply apparatus comprises:
a first output power circuit including a first switching circuit for receiving said first input voltage, wherein said first switching circuit is alternately conducted or shut off, so that said first input voltage is converted into a first internal output voltage;
a first output protection circuit connected to a power output terminal of said first output power circuit for limiting the current direction, wherein the electrical energy of said first internal output voltage is transmitted to said system circuit through said first output protection circuit;
a first output capacitor connected to said power output terminal of said first output power circuit;
a first pre-charging circuit interconnected between a power input terminal and a power output terminal of said first output protection circuit for providing a first pre-charging path; and
a first power supply control circuit connected to a control terminal of said first switching circuit and said power output terminal of said first output power circuit for determining whether a first pulse width modulation signal is transmitted to said control terminal of said first switching circuit according to said first power-on signal, wherein when said first power-on signal is switched from a disabled status to an enabled status, a first pulse width modulation signal having a higher or the maximum duty cycle is transmitted from said first power supply control circuit to said control terminal of said first switching circuit, thereby enabling said first output power circuit.

24. The power supply system according to claim 23 wherein said first power supply apparatus further includes a first output resistor and a third switching circuit, which are serially connected between said power output terminal of said first output power circuit and a common terminal, wherein if said first power-on signal in an enabled status is transmitted to said third switching circuit, said third switching circuit is conducted, so that said first output resistor is connected between said power output terminal of said first output power circuit and said common terminal.

25. The power supply system according to claim 24 wherein said first power supply apparatus further includes a first bus capacitor, which is interconnected between a power input terminal of said first output power circuit and said common terminal for storing electrical energy.

26. The power supply system according to claim 23 wherein said first power supply control circuit comprises:
a first feedback circuit connected to said power output terminal of said first output power circuit for generating a first feedback signal according to said first internal output voltage;
a first output power control circuit connected to said first feedback circuit for generating said first pulse width modulation signal according to said first feedback signal;
a second switching circuit interconnected between said control terminal of said first switching circuit and said first output power control circuit, wherein when said second switching circuit is conducted, said first pulse width modulation signal is transmitted to said control terminal of said first switching circuit through said second switching circuit, and said first switching circuit is alternately conducted or shut off according to said first pulse width modulation signal, so that said first output power circuit outputs said first internal output voltage and said output voltage having rated voltages to said system circuit; and
a first micro-controller connected to a control terminal of said second switching circuit, said first output power control circuit and said power output terminal of said first output power circuit, wherein said first micro-controller controls operations of said first output power control circuit and on/off statuses of said second switching circuit according to said first power-on signal.

27. The power supply system according to claim 26 wherein when said power supply apparatus provides electrical energy to said system circuit, said first micro-controller of said first power supply control circuit generates said first power status signal in an enabled status.

28. The power supply system according to claim 26 wherein said first power supply apparatus further includes a first input power circuit, which comprises a fourth switching circuit, wherein an power output terminal of the first input power circuit is connected to a power input terminal of said first output power circuit, and said first input voltage is converted into a first bus voltage by said first input power circuit.

29. The power supply system according to claim 28 wherein said first power supply control circuit includes a first input power control circuit, which is connected to a control terminal of said fourth switching circuit and said first micro-controller for generating a first power factor correction signal to said control terminal of said fourth switching circuit.

30. The power supply system according to claim 29 wherein under control of said first micro-controller, according to said first power-on signal in said enabled status, said first input power control circuit generates said first power factor correction signal, so that said first bus voltage is greater than zero or maintained at a rated voltage.

31. The power supply system according to claim 23 wherein said first output protection circuit determines whether a power input terminal and a power output terminal of said first output protection circuit are conducted according to said first internal output voltage and said output voltage.

32. The power supply system according to claim 23 wherein said first pre-charging circuit includes a first pre-charging resistor, and said first pre-charging circuit provides a first pre-charging path according to said first power-on signal in said enabled status, wherein electrical energy of said output voltage is previously charged into said first output capacitor through said first pre-charging resistor, so that said first internal output voltage is initially increased and greater than zero.

* * * * *